R. L. HOBBS.
VALVE.
APPLICATION FILED MAR. 28, 1910.
982,815.
Patented Jan. 31, 1911.
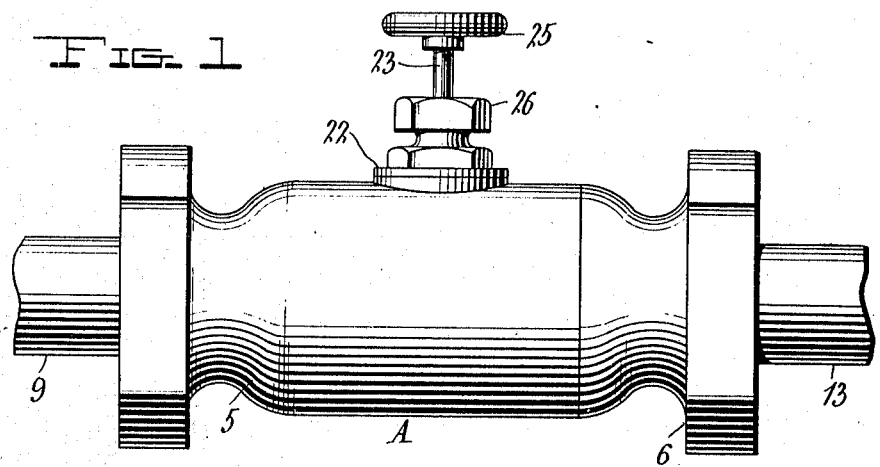
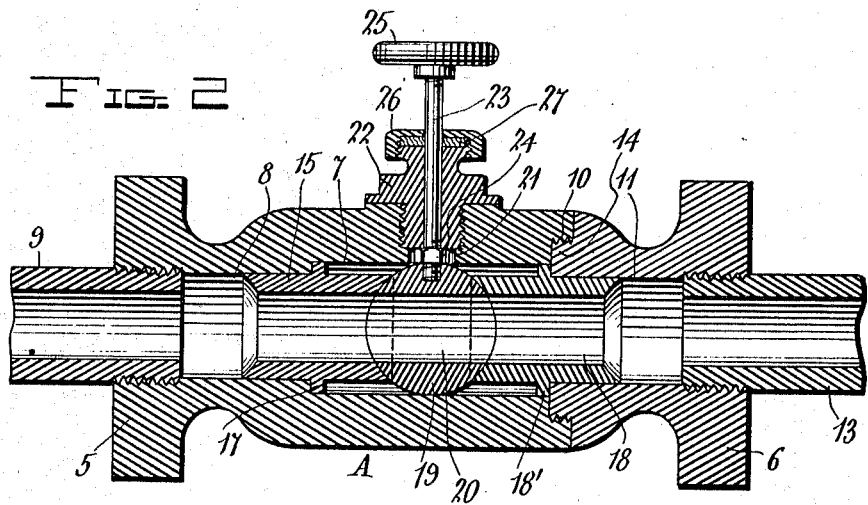
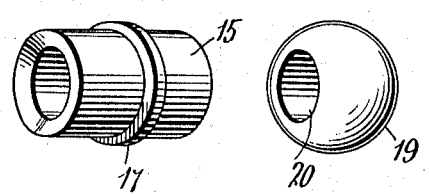
Witnesses
Inventor
R. L. Hobbs
By Chandler & Chandler
Attorneys

UNITED STATES PATENT OFFICE.

RUSH L. HOBBS, OF SUMNER, ILLINOIS.

VALVE.

982,815.  Specification of Letters Patent.  Patented Jan. 31, 1911.

Application filed March 28, 1910. Serial No. 551,911.

*To all whom it may concern:*

Be it known that I, RUSH L. HOBBS, a citizen of the United States, residing at Sumner, in the county of Lawrence, State of Illinois, have invented certain new and useful Improvements in Valves; and I do hereby declare the following to be a full, clear, and exact description of the invention, such as will enable others skilled in the art to which it appertains to make and use the same.

This invention relates to valves and particularly that type which utilize a spherical closure located within a casing.

The object of the invention is the production of a valve of the character named wherein the construction is simplified and the operation rendered more efficient by providing means whereby the spherical closure is seated without resorting to the difficulty and expense of forming a circular seat in the casing for the closure as has heretofore been necessary in valves of this type.

A further object of the invention resides in constructing the valve with certain interchangeable parts whereby the operation of assembling is facilitated and simplified.

With the above and other objects in view the invention consists in the details of construction and in the arrangement and combination of parts as will be hereinafter fully described and particularly pointed out in the appended claims.

In describing the invention in detail reference will be had to the accompanying drawings wherein like characters of reference denote corresponding parts and in which, Figure 1 is a side elevation of a valve constructed in accordance with the invention; Fig. 2, a vertical longitudinal section of same; Fig. 3, a detail perspective view of one of the reversible seats of the spherical closure; and, Fig. 4, a detail perspective view of the spherical closure.

Referring to the drawings, the valve is shown as formed of a casing A which includes independent portions 5 and 6 adapted to be detachably secured together. The portion 5 is provided with a central longitudinal bore 7, the outer portion of which is reduced as at 8 and partially threaded for connection with a pipe 9. The inner end of the portion 5 is provided with a circular recess 10, the cylindrical wall of which is threaded for a purpose that will presently appear. The portion 6 of the casing A is also provided with a bore 11, the outer end of which is reduced as at 12 and partially threaded for detachable connection with a pipe 13. The inner end of the portion 6 is provided with an interiorly threaded reduced extension 14 adapted to be screwed into the recess 10 of the portion 5, whereby said portions 5 and 6 are detachably assembled. A tubular valve seat 15 is disposed in the bore of the portion 5 and has one end seated in the reduced portion 8 of said bore 7. An annular flange 17, on the exterior of the tubular seat 15 is disposed against the shoulder formed by the reduced portion 8 of the bore 7 to hold said seat against outward movement in said bore. Each end of the tubular seat 15 is beveled inwardly so as to form a bearing for a spherical valve closure to be presently referred to, it being understood that said seat is reversible as the result of the corresponding formation of its ends. The bore 11 is also adapted to receive a tubular valve seat 18 which is identical in construction in every respect with the seat 15 and a detail description thereof is deemed unnecessary; it being only necessary to state that the seat 18 is provided with an annular flange 18′ which abuts the end of the extension 14 whereby said seat is held against rearward movement in the bore 11.

Disposed in the enlarged portion 16 of the bore 7 is a spherical valve closure 19, the diametrically opposite sides of which are disposed in the adjacent ends of the tubular seats 15 and 18. The closure 19 is provided with a through port 20 adapted for registration with the bore of the seats 15 and 18. Formed in the upper side of the portion 5 is an aperture 21 which has its lower end reduced and its upper end threaded for the reception of a threaded plug 22. Passing vertically through the block 22 is an operating stem 23, the lower end of which is secured to the closure 19 through the medium of a jam nut 24, while its upper end is provided with a hand wheel 25 for rotating said stem. A cap 26 is screwed on the upper end of the plug 22 and a suitable packing 27 is disposed between said cap and plug to prevent any leakage by way of the stem 23.

From the foregoing description it will be apparent that an exceedingly simple valve employing a spherical closure is produced and the necessity of providing a spherical seat for the closure in the valve casing is obviated, while at the same time the interchangeability of various parts of the valve will enable same to be easily and securely assembled and greatly reduce the cost of installation and manufacture.

What is claimed is:

A valve comprising a casing formed of two detachably connected tubular sections, one of said sections having one end of its bore enlarged and a resultant shoulder, the other of said sections being threaded to the first named section at the end thereof through which the enlarged portion of its bore opens and in longitudinal alinement therewith, the bore of said second named section having the same diameter as the smallest portion of the bore of the first named section, whereby a second shoulder is formed at the end of the enlarged portion of the bore of the first named section opposite the first named resultant shoulder, a spherical closure provided with a through port mounted in the enlarged portion of the bore of the first named section, a tubular valve seat mounted in the bore of the first named section for slidable detachment therefrom and having one end in engagement with one side of the spherical closure, an annular flange on said seat intermediate its ends engaging the first named shoulder to hold said seat against outward movement in one direction, a second tubular valve seat mounted in the bores of the first and second named sections for slidable detachment therefrom and having its inner end engaging the spherical closure in opposition to the first named seat, an annular flange formed intermediate said second named seat and engaging said second named shoulder, whereby said second named seat is held against outward movement, and means for rotating said closure.

In testimony whereof, I affix my signature, in presence of two witnesses.

RUSH L. HOBBS.

Witnesses:
 JAMES I. WAGNER,
 OLIS THOM.